Aug. 20, 1957 — O. T. HORN — 2,803,422
WEIGHING MACHINES
Filed Nov. 13, 1951 — 3 Sheets-Sheet 1
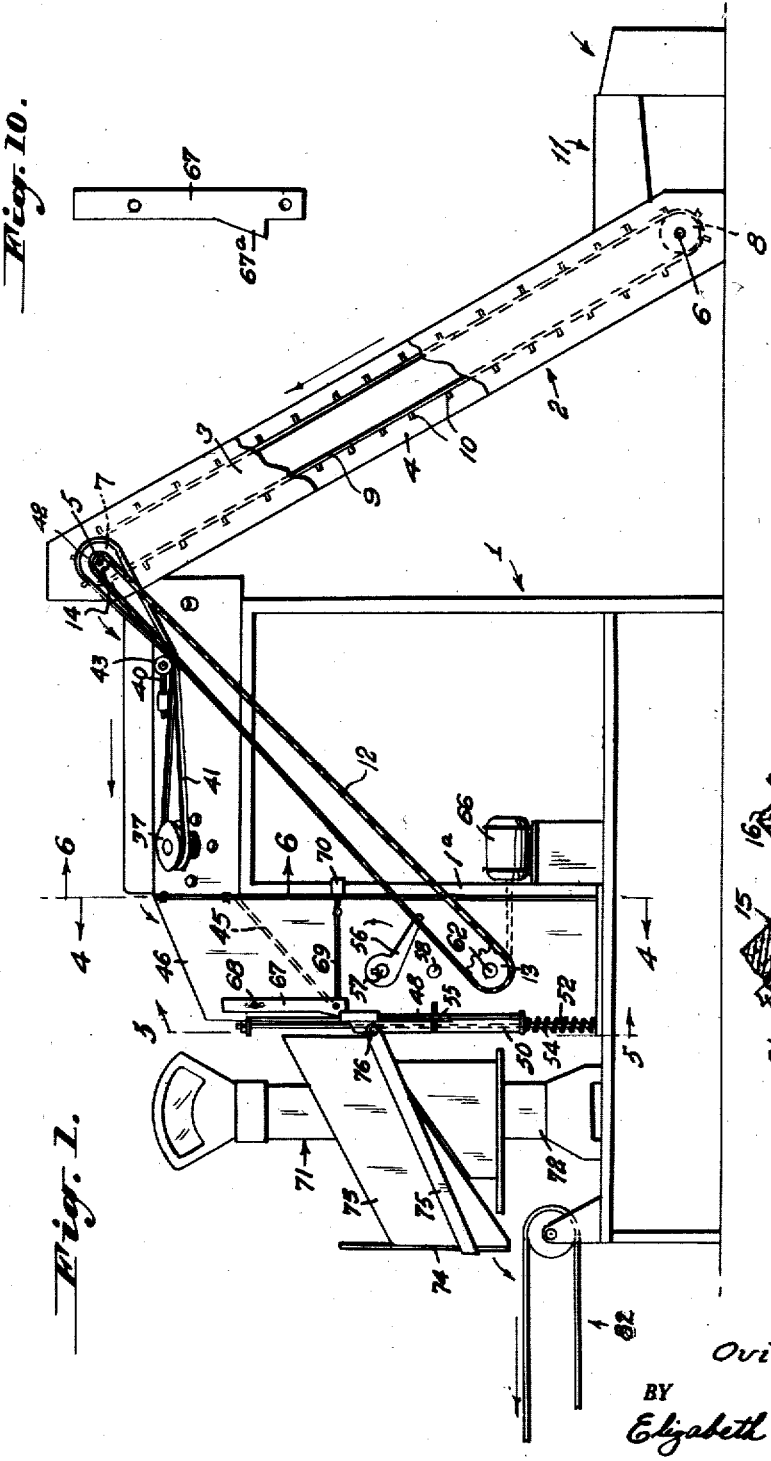
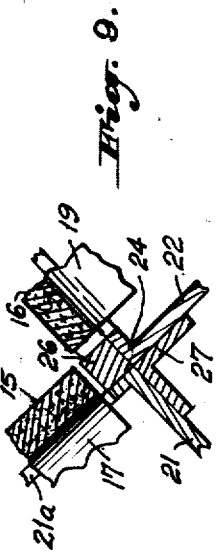
INVENTOR.
Ovid T. Horn
BY Elizabeth Newton Dew
Attorney.

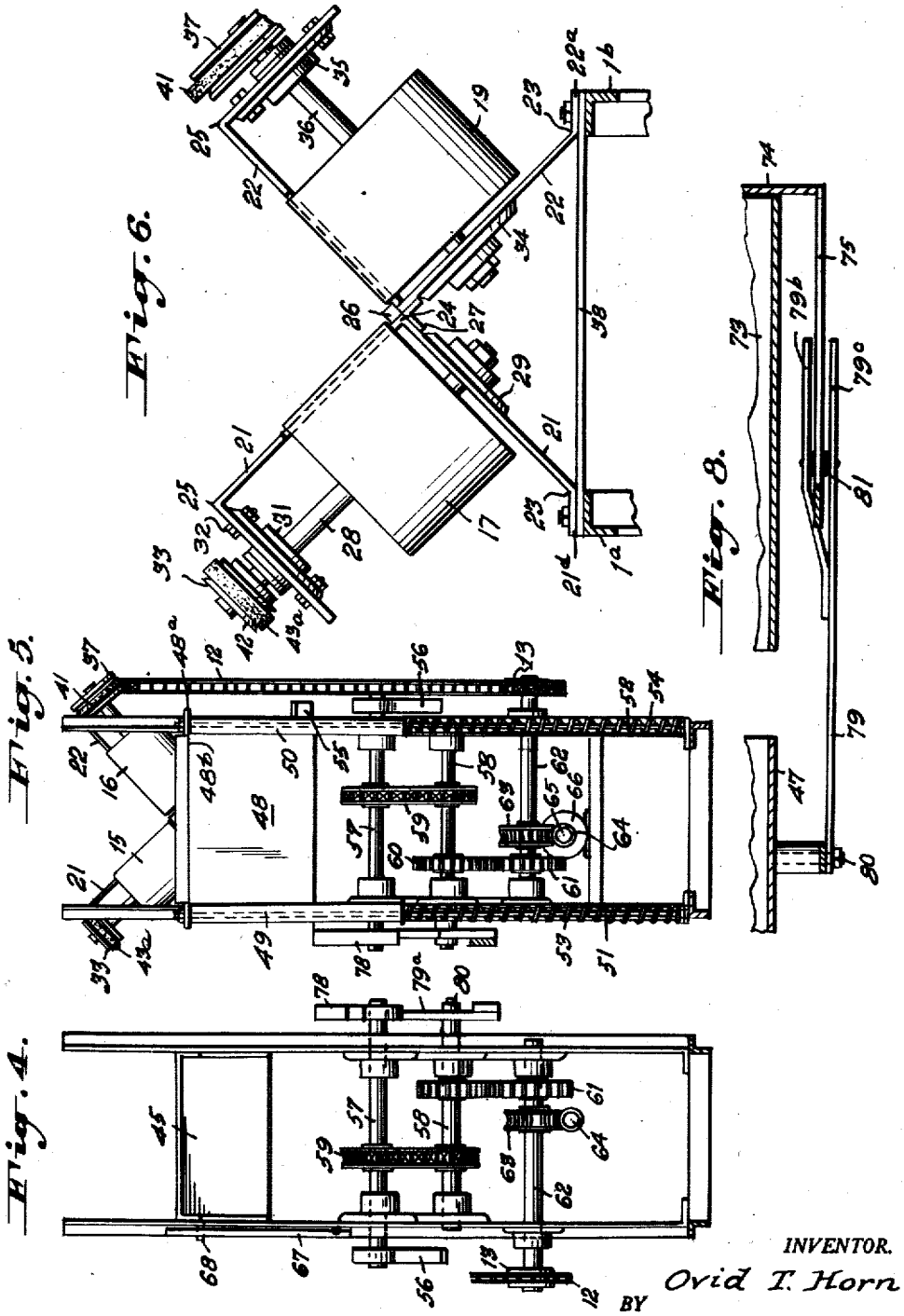

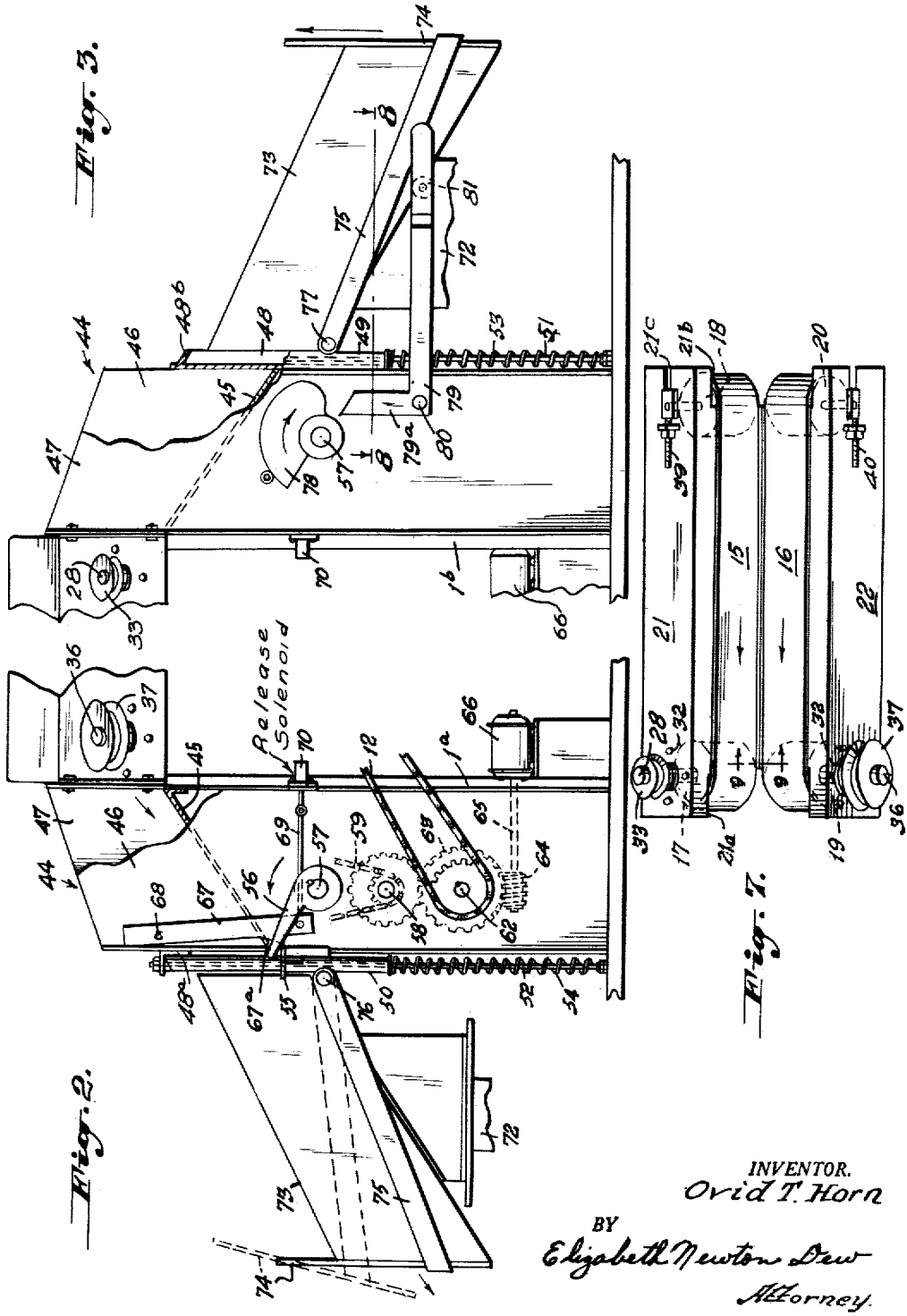

United States Patent Office 2,803,422
Patented Aug. 20, 1957

2,803,422

WEIGHING MACHINES

Ovid T. Horn, Alamosa, Colo.

Application November 13, 1951, Serial No. 256,083

12 Claims. (Cl. 249—2)

This invention relates to automatic weighers and more particularly to that type of automatic weigher adapted to weigh in sequence discrete or separate batches of material or articles, all batches having the same predetermined weight.

In my copending application, Serial Number 793,801 filed December 26, 1947 now Patent 2,598,260, dated May 27, 1952, I have disclosed a weigher of the aforesaid type wherein the material to be weighed, for example, potatoes, is elevated by a suitable inclined conveyor and then deposited onto a second horizontal conveyor from which the material passes to a hopper carried by the load support or beam of a weighing scale. A vertically slidable gate is interposed between the horizontal conveyor and the weighing hopper. This gate is movable vertically from a first or upper position wherein the path of the articles from the horizontal conveyor to the weighing hopper is obstructed, to a second or lowered position wherein the material being weighed may freely flow into the hopper. Starting with the gate closed, material accumulates on the conveyor behind the gate. The gate is then lowered by mechanism driven in timed relation with the conveyor belt to allow the accumulated material or articles to pass to the weighing hopper. The downward motion of the gate compresses a spring or springs to urge the gate into its first or upper position. As the gate moves into its fully lowered or open position, releasable latch mechanism automatically secures it in such position. At the instant that the predetermined weight of material has accumulated in the hopper, the weighing scale operates to close a switch which releases the aforesaid gate-latch mechanism thereby permitting the springs to again raise the gate into obstructing position and cutting off further flow of material to the hopper until the batch being weighed has been dumped therefrom. The hopper is dumped to deposit the weighed batch into the trough of a packaging device. Thereafer the cycle is repeated.

The aforedescribed mechanism is fully shown and disclosed in my aforesaid patent and it is the main purpose of the present invention to provide an automatic batch weigher of the type described in the preceding paragraphs which is more rapid in operation, more accurate, simpler to construct and operate, and a general improvement over the weigher described in my aforesaid patent.

More particularly it is an object of the invention to provide an automatic batch weigher wherein an accumulator bin is provided between the weighing hopper and the conveyor together with means whereby the flow of material from said bin is obstructed until substantially, but not quite batch weight is attained.

Another object is the provision of an automatic weigher wherein articles, a batch of which are to be weighed, are conveyed or trickled single file into an accumulator bin until substantially batch weight is obtained and then suddenly releasing all said accumulated articles for gravity movement to a weigher, in timed relation with actuation of the conveyor, while continuing a single file trickle of articles into the hopper until exact batch weight has been obtained.

A still further object of my invention is the provision of a conveyor in the aforesaid combination which assures a uniform, single-file flow of articles into the hopper and bin at all times during operation whereby precise and rapid batch weighing is assured.

Other objects and advantages of the invention will appear to those skilled in the art after a study of the following specification in connection with the drawings forming a part of this application.

In the drawings:

Figure 1 is a side elevation of the automatic weigher.

Figure 2 is a side elevation to an enlarged scale of a portion of Figure 1 showing the accumulator bin, the weighing hopper, and the gates controlling the movement of material into and from the hopper.

Figure 3 is an elevation to an enlarged scale, of the side of the accumulator bin and weighing hopper opposite to that shown in Figure 2.

Figure 4 is a vertical transverse section taken in a plane indicated by the line 4—4 of Figure 1 and showing the gate controlling entrance of material to the weighing hopper and the operating mechanism therefor, as well as the cam operating the gate controlling exit of material from the hopper.

Figure 5 is a vertical transverse section taken in a plane identified by the line 5—5 of Figure 1 and showing the entrance gate, closing springs and operating mechanism for the gate.

Figure 6 is a vertical transverse section in a plane identified by line 6—6, Figure 1, showing to an enlarged scale the two rearward pulleys and their mounting bracket for the two flat belts forming a V-shaped conveyor.

Figure 7 is a plan view of the two belts forming a V-shaped conveyor or trough.

Figure 8 is a sectional view taken in a plane identified by line 8—8, Figure 3, and showing in detail the mechanism for operating the door of the weighing hopper.

Figure 9 is a sectional detail view taken substantially on line 9—9, Figure 7, and Figure 10 is a view showing the gate retaining latch.

Referring in detail to the drawing, particularly Figure 1, a frame 1 is built up of metallic rods or bars bolted or welded together to form a rigid unitary support for moving parts of the machine.

A conveyor or elevator is generally identified at 2 for the purpose of feeding material to be weighed to the machine. This elevator has one end resting upon the floor or ground and the other supported upon frame 1. It consists of spaced parallel side plates 3 and 4 which have spaced aligned bearings at their lower and upper ends for journaling conveyor shafts 5 and 6 each having respective conveyor pulleys 7 and 8 fixed thereto. Conveyor belt 9 extends about the pulleys and has a width a little less than the distance between side plates 3 and 4. Cleats 10 are secured to the surface of the belt and, when the belt is being driven, serve to elevate potatoes or other articles or material from a receptacle generally indicated at 11, to the top of the machine. The belt is shown as driven by a chain 12 extending from a sprocket 13 at the lower forward portion of the machine to a second sprocket 14 fixed upon an end of shaft 5 projecting through plate 3.

From the upper end of conveyor 2 the material to be weighed is dumped upon a generally horizontal conveyor formed by the upper passes of two flat belts 15 and 16, Figure 7, conjointly forming a V-shaped trough. Belt 15 is mounted by a pair of pulleys 17 and 18 and belt 16 by a pair of pulleys 19 and 20.

The pulleys are journaled in a frame built up from two substantially identical plates 21 and 22 having cut outs such as 21a, Figure 7, at their ends for reception of the respective pulleys. The plates are bent at an obtuse angle along line 23, Figure 6 and at 90° along lines 24 and 25. The plates are then united along line 24 as by welding a length of angle iron 27 to their lower contiguous faces, and a square fillet 26 to their upper faces. The fillet has about the same transverse dimensions as the thickness of belts 15 and 16. See Fig. 9.

As clearly shown upon Figure 6 in connection with pulley 17 for example, this pulley is fixed to a shaft 28 journaled at its lower end in a bearing 29 bolted to plate 21, and at its upper end in a bearing 31 secured by bolts 32. The shaft has a V-belt pulley 33 secured to its upper, outer end. As the other rearward pulley, that is, pulley 19 of belt 16 has an identical mounting, it is sufficient to identify lower bearing 34, upper bearing 35, both fixed to plate 22, shaft 36 to which pulley 19 is fixed, and V-belt pulley 37. The two aligned horizontal flanges 21d and 22a of the respective plates are, together with a brace bar 38, bolted to the upper horizontals 1a and 1b of frame 1. See Figure 6. From this figure as well as from Figure 9 it will be noted that the faces of the pulleys extend a little above the upper faces of the plates. As the belts have about the same thickness as that of fillet 26, their lower edges are only slightly spaced along their upper or top pass and thereby form a conveyor, V-shaped in cross section. Furthermore, the upper run of each of the belts is slightly spaced above the subjacent surface of its plate so that the plates form a backing or support for the belts as they convey material therealong.

At their material-receiving ends the two belts 15 and 16 pass over pulleys 18 and 20 respectively, Figure 7. These pulleys are mounted in bearings which are slidably mounted in cut-outs such as 21c of plate 21 for example, whereby the belts may be tightened in a well known manner by adjustment of threaded rods 39 and 40.

From Figure 1 it is noted that pulley 37 is operated by a belt 41 and a driving pulley 42 fixed to shaft 5 between sprocket 14 and plate 3. An idler 43 is provided for effecting the proper tension of the belt and for deflecting the runs thereof from the vertical plane at pulley 42 to the 45° inclination at pulley 37. V-belt pulley 33 on shaft 28 is driven in a similar manner by a belt 43a, Figure 6, which in turn is driven by a pulley, not shown, but fixed upon shaft 5 at the projecting end thereof at the side of the machine opposite to that shown in Figure 1, and passing over an idler, not shown, but similar in all respects to 43. However, as clearly shown at Figure 6, pulley 33 has a smaller diameter than pulley 37 at the other side, so that belt 15 is driven at a substantially greater speed than belt 16. In the case where potatoes, for example, are being weighed in batches, the difference in speeds of the two belts causes the potatoes to roll simultaneously with their translation along the two belts whereby a smooth uniform feed of potatoes to the accumulator bin is effected despite substantial irregularities in the feed effected by elevating conveyor 2. This is of great importance in rapid accurate weighing and enables each batch to be accurate to the nearest potato or other objects being weighed.

From belts 15 and 16 the material is deposited in an accumulator bin generally identified by the numeral 44, and having a downwardly and rearwardly inclined bottom 45. The sides of the bin are formed by vertical plates 46 and 47 having their forward vertical edges secured to the uprights 1a and 1b of frame 1. The bin is built up in any suitable manner as by welding or riveting.

At its rearward or discharge side, bin 44 has a vertical door or gate 48 which is vertically slidable by mechanism subsequently described, from an upper position closing the discharge side of the bin and causing the accumulation therein of material falling from belts 15 and 16, to to a lower position in which the discharge side of the bin is cleared for the discharge by gravity of the accumulated material into the weighing hopper. In Figure 1 the gate is shown in lowered position while in Figures 2, 3, and 5 it is shown in elevated position. The gate is a generally flat rectangular plate having parallel guide tubes 49 and 50, Figure 5. These tubes are secured, preferably by welding, to the respective vertical side edges of the plate. Two guide rods 51 and 52, Figures 1, 2, 3 and 5, are secured to brackets on frame 1, in vertical spaced parallel relation at the respective corners of the accumulator bin. The rods may be threaded at each end and held in position by nuts thereon on opposite sides of the brackets. Each guide rod passes through a respective one of the tubes 49 and 50 with a smooth sliding fit whereby the gate is mounted for vertical translation as previously explained. When in lowered position, a rearwardly and downwardly turned lip 48b on the upper edge of the door, is substantially coplanar with the correspondingly inclined floor of the bin whereby all material therein flows into the weighing hopper, subsequently described.

The door or gate 48 is urged into upper or closed position by a pair of coil springs 53 and 54 each mounted upon a respective rod 51 and 52. Each spring abuts at its bottom against a part of the frame and at its top against one of the gate tubes or slides. A bracket 55, Figures 1, 2 and 5, is rigidly attached to and extends transversely from guide tube 50 and forms an abutment or rider for an arm 56 which periodically engages the bracket and lowers the gate to discharge position. This arm or lever has a hub which is keyed or otherwise fixed to a shaft 57 journaled in bearings carried by respective side plates which may be downward extensions of plates 46 and 47 forming the sides of accumulator bin 44.

Shaft 57 is driven from an idler shaft 58 by means of a chain and sprocket connection indicated at 59, Figures 4 and 5. Shaft 58 is also journaled in bearings carried by the aforesaid side plates and has a gear 60 keyed thereto which meshes with a gear 61 keyed on a shaft 62, likewise journaled in bearings carried by the side plates. Shaft 62 has a worm gear 63 secured thereto which meshes with and is driven from a worm 64 secured upon motor shaft 65. Motor 66 is bolted to a stand integral with the frame 1 and drives shaft 65 either direct or through a fixed or a variable type speed reducer of known design (not shown). The end of shaft 62 extends through plate 46 and its projecting end carries gear 13 which has previously been described as driving the elevator 2 and conveyor belt 41 through chain 12.

The releasable latch for holding door or gate 48 in lowered position was previously mentioned. This latch is best shown upon Figures 2 and 10 and comprises a bar 67 pivoted at 68 at its upper end on plate 46 adjacent gate 48. The bar has a nose 67a positioned to snap over a lug 48a projecting transversely from the top edge of the gate, as the latter moves into the fully lowered or discharge position, as shown in Figure 1. The bar, at a point near its lower end, is connected with an actuating rod 69 whose other end is attached for actuation by a solenoid 70. The general construction and function may be the same as in my aforesaid patent, whereby there is a yielding spring-pressed connection (not shown) between rod 69 and solenoid 70 so that the latch bar 67 may pivot slightly counterclockwise as viewed in Figure 2, without movement of the solenoid plunger, while energization of the solenoid positively pivots the latch counterclockwise and releases gate 48 for movement to fully elevated position under the urge of springs 53 and 54. Alternatively, of course, the yielding connection may be between the bar 67 and rod 69. In a manner also fully disclosed in my prior patent, solenoid 70 is in a circuit which also includes a switch, not shown, closed in response to a predetermined weight or load upon the weighing scale, generally indicated at 71. See Figure 1. Since the weighing scale may be of any approved type and forms no part of the invention apart from the combination, it has not been shown in detail.

The platform 72 of the scale 71, supports a hopper 73 having an inclined floor positioned substantially coplanar with the floor 45 of bin 44. The side walls of the hopper are conveniently vertical and substantially coplanar with the corresponding sides of the bin. The side of hopper 73 remote from gate 48 is closed by a door 74 rigidly attached to a yoke 75. As shown at Figures 1, 2 and 3, this yoke has aligned pivots 76 and 77 at the respective sides of the hopper, whereby the door is guided in an arcuate path of long radius, from the fully closed position of Figure 2 to a second raised position indicated in dotted lines upon Figure 2. This motion is effected by a cam 78, Figure 3, fixed to the right projecting end of shaft 57, in position to engage the shorter end 79a of a bellcrank 79, pivoted at 80, Figures 3 and 8, upon side plate 47. As best shown at Figure 8 the outer end of the longer arm of bellcrank 79 is forked to provide axially spaced parallel sections 79b and 79c which embrace a portion of yoke 75 and act as a guide therefor. These sections journal a roller 81 therebetween which lies just beneath an adjacent portion of the yoke. Cam 78 is shaped substantially as illustrated upon Figure 3 and, on rotation in the direction of the arrow, engages the shorter arm of bellcrank 79 and pivots it. The resulting elevation of roller 81 causes upward pivoting of yoke 75 and the raising of door 74, thereby permitting the material or batch accumulated therein to discharge by gravity to a conveyor or packaging device of suitable or known type. As this feature forms no part of the present invention, it has been indicated merely generally at 82, Figure 1.

The operation will be clear from the foregoing description and may be briefly resumed as follows. With motor 66 in operation and driving shaft 62, the elevator 2 is driven by sprocket 13, chain 12 and sprocket 14 to elevate material such as potatoes, from receptacle 11 to the conveyer formed by belts 15 and 16, which are also driven by belts 41 and 43 and pulleys 37 and 42. As the belts are driven at different speeds as previously described, they act to roll the potatoes along in close uniform single file and effectively prevent bunching or piling one on the others.

Idler shaft 58 is driven from shaft 62 by gears 61, 60 which in turn drives shaft 57 through chain and sprocket connection 59. Rotation of shaft 57 causes rotation of arm 56 and cam 78 carried at the respective ends thereof. The arm and cam are so angularly related upon the shaft, that arm 56 first engages bracket 55 and lowers gate 48 an appreciable time before cam 78 acts upon bellcrank 79 to raise door 74.

Assuming that gate 48 is raised, potatoes coming off conveyor belts 15 and 16 are deposited in bin 44 at a rate such that a weight of potatoes a little less than that of the predetermined batch weight for which the machine has been adjusted, are accumulated in the bin by the time arm 56 has rotated into contact with bracket 55. As the arm engages the bracket and continues rotation, gate 48 is lowered and springs 53 and 54 are compressed. Just before the arm slips off the bracket, the upper bracket 48a on the gate engages the nose 67a of latch 67 and pivots it against the yielding connection with solenoid 70. The nose then snaps over bracket 48a and holds the gate in lowered or open position.

As the gate opens, the potatoes accumulated in bin 44 gravitate into weighing hopper 73 and the weight therein is continuously augmented by a single file or trickle of potatoes as they come off belts 15 and 16, drop onto the slanting floor of the bin and pass uninterruptedly to hopper 73. The time required for the final increment of batch weight to accumulate in the hopper is very small and the parts and rates of drive are so related that batch weight is accumulated just before cam 78 starts to raise door 74.

At the instant exact batch weight is obtained in the hopper, the scale acts to close the solenoid circuit, in the manner fully taught by my aforesaid patent. Energization of the solenoid pulls rod 69 to the right, Figure 2, and pivots latch 67 until its nose passes off bracket 48a. The door then immediately rises under the urge of compressed springs 53 and 54 to thereby cut off further flow of potatoes to hopper 73. Cam 78 then acts in the manner previously described, to raise door 74 and cause the batch in hopper 73 to gravitate onto the conveyor, sacking, or packaging machine. Meantime a second batch is accumulating in bin 44 and has attained substantially batch weight by the time arm 56 has again rotated to lower gate 48. As the previous batch has passed from the weighing hopper by this time, the solenoid has been de-energized and its spring, not shown, has returned latch 67 into position to again lock the gate when moved to lowered position. Thereafter, the cycle is repeated.

It will thus be seen that I have provided a relatively simple and precise automatic batch weigher which is rapid in operation while very accurate. By adjustment of the scale to close the solenoid circuit in response to a predetermined weight of material in the hopper, the machine may be adjusted for any selected batch weight over a substantial range. By coordination of the rates of feed to belts 15, 16 and thence to bin 44, with rotation of shaft 57, a very rapid succession of accurately weighed batches is assured. In actual practice it has been found that one man with my invention can bag 8 to 10 batches per minute; and each batch is accurate to the nearest unit article. While I have mentioned potatoes as a produce with which the invention has been very successfully employed, it will be clear that this is merely by way of example, and that the machine with or without slight modification and/or adjustment, is capable of the equally accurate and rapid weighing of a wide variety of produce, materials or articles to be packed in batches of equal weight.

Since the conveyor belts 15 and 16 travel at speeds having a constant difference with respect to time, the term "linear travel" of the conveyor, as used in the claims, may be taken as the speed of either of the belts or as the mean speed of both.

While I have shown a preferred form of the invention, numerous modifications, alterations and substitutions will be obvious to those skilled in the art after a study of the foregoing description. Consequently the description is to be taken in an illustrative rather than a limiting sense; and it is my desire and intention to reserve all modifications and substitutions falling within the scope of the subjoined claims.

Having now fully disclosed the invention, what I claim and desire to secure by Letters Patent is:

1. In an automatic batch weigher, an accumulator bin having an open side and an inclined floor sloping upwardly away from said open side, a gate, means fixed with said bin and guiding said gate for vertical translation from an upper position closing said open side, to a lower position freeing material in said bin for discharge therefrom by gravity, a weighing scale, a hopper supported by said scale to receive material discharged from said bin, a conveyor adapted to discharge a substantially constant flow of material into said bin, power means for continuously driving said conveyor, and a direct continuous drive between said power means and said gate for periodically operating said gate in timed relation with linear travel of said conveyor.

2. An automatic batch weigher as recited in claim 1, said conveyor comprising a pair of endless flat belts, means mounting said belts so that their upper runs conjointly form a trough V-shaped in cross section, said power means operating said belts at different linear speeds.

3. In an automatic batch weigher as recited in claim 1, said conveyor comprising a pair of flat belts, two pairs of pulleys each mounting a respective belt so that their upper runs form a V-shaped trough and driving connections from said power means to said belts and driving said belts at different linear speeds.

4. In an automatic weigher, a weighing scale, a receptacle on said scale to receive articles to be weighed, an accumulator bin having a sloping floor and a discharge opening to discharge by gravity in said receptacle all articles in said bin when said opening is unobstructed, a gate movable from a first position closing said opening, to a second position clear of said opening, to leave the same unobstructed, a conveyor comprising a pair of endless flat belts having their upper runs forming a V-shaped trough, means mounting said conveyor in position to discharge material into said bin, a source of power, a driving connection from said source to said belts and operating the same at different linear speeds, and a driving connection from said source to said gate to periodically operate the same in timed relation with linear travel of said belts.

5. In an automatic batch weigher for articles, a frame, a bin on said frame and having an opening to discharge material therefrom by gravity, a gate movable from a first position closing said opening, to a second position clear of said opening, a conveyor on said frame constructed and arranged to deposit articles into said bin at a constant time rate, power means for continuously driving said conveyor, a weighing hopper having a sloping surface and a passage to discharge articles in said hopper by gravity, a door associated with said hopper and movable between a first position closing said passage, to a second position clear of said passage, and a direct continuous drive between said power means and said gate and door for periodically operating said gate and door in timed sequence and in timed relation with linear travel of said conveyor.

6. An automatic batch weighing machine, comprising an accumulator bin having a sloping floor and an open side positioned to discharge articles in said bin by gravity, a gate vertically movable from a first upper position closing said open side, downwardly to a second position below the level of said floor to effect gravity discharge of articles in said bin, spring means urging said gate into upper position and stressed by movement of said gate into second position, a weighing scale mounted adjacent said gate, a hopper on said scale positioned to receive articles discharged from said bin, as aforesaid, and including a door movable to effect discharge of articles from said hopper, a substantially horizontal conveyor positioned to deposit articles into said bin, power means connected to continuously drive said conveyor, and a direct continuous drive between said power means and said gate and door for periodically moving said gate and door in timed relation with linear travel of said conveyor.

7. An automatic batch weigher, comprising an accumulator bin having a sloping bottom so that articles therein may pass therefrom by gravity, said bin also having its lower side open, a conveyor effective to deposit articles one by one into said bin, a weighing hopper, a weighing scale supporting said hopper in position to receive articles from said bin, a gate movable from a first position closing the open side of said bin, to a second position clear of said open side to discharge articles by gravity into said hopper, means operable to move said gate to second position, latch means releasably holding said gate when moved to second position, spring means urging said gate into first position, power means directly connected with said conveyor to drive the same, a direct continuous drive from said power means to said gate-operating means for periodically moving said gate to second position in timed relation with linear travel of said conveyor, and means responsive to a predetermined batch weight in said hopper to release said latch means.

8. In an automatic batch weigher an accumulator bin having a downwardly sloping floor leading to an open side of said bin, a conveyor positioned to discharge articles into said bin, said conveyor comprising two pairs of cylindrical pulleys, a pair of flat belts each passing about and drivingly connecting the pulleys of a respective pair, means journaling said pulleys so that the upper runs of said belts conjointly form a trough V-shaped in cross section, means driving said flat belts at different linear speeds, a weighing hopper adjacent said bin and having a sloping floor forming a continuation of the floor of said bin and leading to an open side of said hopper, a gate vertically slidable from an upper position closing the passage between said bin and hopper, to a lower position freeing material in said bin for gravity discharge to said hopper, means yieldingly urging said gate into closed position, releasable latch means automaticallly operable in response to movement of said gate to lower position to hold the same in said position, a door normally closing the open side of said hopper and movable to open position clear of said side to permit gravity discharge of articles therefrom, power driven means continuously operating said conveyor belts and periodically moving said gate to lower position and said door to open position, sequentially and in timed relation with the linear speed of said belts, and means responsive to accumulation of a predetermined weight of articles in said bin to release said latch means.

9. In an automatic weigher, an accumulator bin, a weighing hopper, both having substantially coplanar sloping floors, the lower side of said bin and the contiguous upper side of said hopper being open, whereby material may discharge by gravity from said bin to hopper, a gate vertically slidable between the open contiguous sides of said bin and hopper from an upper position closing the open side of said bin to accumulate material therein, to a lower position freeing said material for gravity discharge to said hopper, a door normally closing the open lower side of said hopper and movable to a position freeing material therein for gravity discharge therefrom, a shaft, means carried by said shaft for sequentially moving said gate to lower position and said door to open position, latch means engaging and automatically holding said gate in lower position in response to movement of said gate to lower position, a conveyor positioned to deposit articles into said accumulator bin, power means, and a direct continuous drive from said power means to said conveyor and to said shaft.

10. In an automatic batch weigher, an accumulator bin having a downwardly and rearwardly sloping bottom, a conveyor positioned to discharge a succession of articles to be weighed into said bin, a weighing hopper positioned to receive articles by gravity from said bin, a gate independently movable from a first position obstructing the passage of articles from said bin into said hopper, to a second position free and clear of said passage, a door operable to close and open the exit passage from said hopper, power means continuously driving said conveyor, and a direct continuous drive between said power means and said gate and door and moving said gate to second position and said door to open position in sequential timed relation with the time rate of operation of said conveyor.

11. In an automatic batch weigher, an accumulator bin having an opening from which materials can discharge by gravity, a closure movable from a first position closing said opening to block discharge of materials from said bin, to a second position free of said opening whereby materials in said bin discharge therefrom by gravity, means releasably securing said closure in second position when moved thereto, a weighing scale, a hopper carried by said scale in position to receive materials discharged from said bin through said opening, spring means urging said closure to first position, power means, a direct continuous drive between said power means and said closure for moving said closure to second position at the end of constant time periods, conveyor means operable to deposit material to be weighed into said bin, and a direct continuous drive between said power means and said conveyor to deposit material into said bin at a masstime rate having a fixed relation with said time periods.

12. In an automatic batch weigher, an accumulator bin having an opening from which materials can discharge by gravity, a first closure movable from a first position closing said opening to block discharge of materials from said bin, to a second position free of said opening whereby materials in said bin discharge therefrom by gravity, means releasably securing said first closure in second position when moved thereto, a weighing scale, a hopper carried by said scale in position to receive materials discharging from said bin through said opening, said hopper having an opening through which all materials in said hopper discharge by gravity, a second closure movable from a first position closing the opening in said hopper to a second position freeing all materials therein, power means, a direct continuous drive between said power means and said first and second closures for periodically operating said first and second closures from first to second positions in timed sequence, conveyor means positioned to deposit material into said bin, and a direct continuous drive between said power means and said conveyor means to deposit material into said bin at a time-mass rate having a fixed relation with the time intervals between successive operations of said first closure to second position.

References Cited in the file of this patent

UNITED STATES PATENTS

| Number | Name | Date |
|---|---|---|
| 290,715 | Steiner | Dec. 25, 1883 |
| 449,276 | Smyser | Mar. 31, 1891 |
| 493,796 | Smyser | Mar. 21, 1893 |
| 761,515 | Lindquist | May 31, 1904 |
| 943,012 | Edtbauer | Dec. 14, 1909 |
| 948,290 | Cromley | Feb. 1, 1910 |
| 1,013,136 | Deats | Jan. 2, 1912 |
| 1,066,566 | Wortham | July 8, 1913 |
| 1,069,362 | Wegner | Aug. 5, 1913 |
| 1,212,011 | Brugmann | Jan. 9, 1917 |
| 1,364,003 | Smith | Dec. 28, 1920 |
| 1,744,676 | Redler | Jan. 21, 1930 |
| 1,881,859 | Mullendore | Oct. 11, 1932 |
| 1,913,868 | Andreas | June 13, 1933 |
| 2,016,204 | King | Oct. 1, 1935 |
| 2,016,443 | Levitre | Oct. 8, 1935 |
| 2,207,885 | Howard | July 16, 1940 |
| 2,226,236 | Bleam | Dec. 24, 1940 |
| 2,303,140 | Sackett | Nov. 24, 1942 |
| 2,327,367 | Nowak | Aug. 24, 1943 |
| 2,361,267 | Clifford | Oct. 24, 1944 |
| 2,384,228 | Allen | Sept. 4, 1945 |
| 2,436,983 | Vrendenburg | Mar. 2, 1948 |
| 2,451,891 | Vagim | Oct. 19, 1948 |
| 2,464,545 | Ahlburg | Mar. 15, 1949 |
| 2,466,386 | Curioni | Apr. 5, 1949 |
| 2,502,380 | Howard | Mar. 28, 1950 |
| 2,536,516 | Peterson | Jan. 2, 1951 |
| 2,598,260 | Horn | May 27, 1952 |
| 2,598,494 | Boliek | May 27, 1952 |

FOREIGN PATENTS

| Number | Country | Date |
|---|---|---|
| 344,205 | Germany | Nov. 17, 1921 |

UNITED STATES PATENT OFFICE

CERTIFICATE OF CORRECTION

Patent No. 2,803,422                      August 20, 1957

Ovid T. Horn

It is hereby certified that error appears in the printed specification of the above numbered patent requiring correction and that the said Letters Patent should read as corrected below.

Column 1, line 51, for "Thereafer" read -- Thereafter --; column 6, line 75, after "trough" insert a comma; column 9, line 16, after "therein" and before the comma insert -- for discharge by gravity therefrom --.

Signed and sealed this 8th day of October 1957.

(SEAL)
Attest:
KARL H. AXLINE
Attesting Officer

ROBERT C. WATSON
Commissioner of Patents